US011370668B2

(12) United States Patent
Fujimoto et al.

(10) Patent No.: US 11,370,668 B2
(45) Date of Patent: Jun. 28, 2022

(54) AMMONIA MANUFACTURING APPARATUS AND AMMONIA MANUFACTURING METHOD

(71) Applicant: JGC CORPORATION, Kanagawa (JP)

(72) Inventors: Sho Fujimoto, Kanagawa (JP); Yasushi Fujimura, Ibaraki (JP); Mototaka Kai, Kanagawa (JP); Yuki Hoshino, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 0 days.

(21) Appl. No.: 17/276,479

(22) PCT Filed: May 1, 2020

(86) PCT No.: PCT/JP2020/018406
§ 371 (c)(1),
(2) Date: Mar. 15, 2021

(87) PCT Pub. No.: WO2021/220505
PCT Pub. Date: Nov. 4, 2021

(65) Prior Publication Data
US 2021/0340017 A1    Nov. 4, 2021

(51) Int. Cl.
*C01C 1/04* (2006.01)
*C25B 1/04* (2021.01)

(52) U.S. Cl.
CPC .......... *C01C 1/0447* (2013.01); *C01C 1/0488* (2013.01); *C01C 1/0417* (2013.01);
(Continued)

(58) Field of Classification Search
None
See application file for complete search history.

(56) References Cited

U.S. PATENT DOCUMENTS 4,161,657 A * 7/1979 Shaffer, Jr. ............. F02M 25/12
290/1 R
4,197,712 A * 4/1980 Zwick ....................... F17C 9/02
60/618
(Continued)

FOREIGN PATENT DOCUMENTS

JP    S6365131    3/1988
JP    2015038039    2/2015
(Continued)

OTHER PUBLICATIONS

Raphael Schmuecker Memorial Solar-Hydrogen System, "Solar Hydrogen & Ammonia Fuel Generation System, System Overview", Obtained Mar. 8, 2021, Available at: http://solarhydrogensystem.com/the-system/.
(Continued)

*Primary Examiner* — Jennifer A Leung
(74) *Attorney, Agent, or Firm* — JCIPRNET

(57) ABSTRACT

Included are: a raw material component storage unit that stores the raw material component supplied to the ammonia synthesis unit; a high-pressure raw material component storage unit that stores the raw material component at a pressure higher than a pressure at which the raw material component is stored in the raw material component storage unit; and a surplus electric power processing unit including a high-pressure raw material component transfer unit that boosts and transfers the raw material component from the raw material component storage unit to the high-pressure raw material component storage unit, and an expander that converts pressure energy of the raw material component supplied from the high-pressure raw material component storage unit into motive power to generate power.

13 Claims, 5 Drawing Sheets

(52) U.S. Cl.
CPC .......... *C25B 1/04* (2013.01); *F17C 2221/012* (2013.01); *Y02P 20/129* (2015.11); *Y02P 20/133* (2015.11)

(56) References Cited

U.S. PATENT DOCUMENTS

| | | | | |
|---|---|---|---|---|
| 8,272,216 | B2* | 9/2012 | Nakamura | C01B 3/042 60/641.8 |
| 10,584,422 | B1* | 3/2020 | Yang | C01C 1/0405 |
| 2007/0079611 | A1* | 4/2007 | Doland | F03G 6/068 60/495 |
| 2007/0107432 | A1* | 5/2007 | Smith | C01C 1/0488 60/673 |
| 2008/0102329 | A1* | 5/2008 | Hollinger | F02M 25/12 429/418 |
| 2009/0077970 | A1* | 3/2009 | Da Costa | F17C 7/00 60/650 |
| 2019/0210885 | A1* | 7/2019 | Fiori | C01C 1/0447 |
| 2020/0277894 | A1* | 9/2020 | Heid | F01K 13/02 |
| 2021/0155491 | A1* | 5/2021 | Ballantine | C25B 9/73 |
| 2021/0179451 | A1* | 6/2021 | Ballantine | C02F 1/441 |

FOREIGN PATENT DOCUMENTS

| | | | |
|---|---|---|---|
| JP | 2019026858 | | 2/2019 |
| JP | 2019143608 | | 8/2019 |
| WO | 2016132842 | | 8/2016 |
| WO | WO-2020035521 A1 * | 2/2020 | ............. C01B 21/26 |

OTHER PUBLICATIONS

"Office Action of Australia Counterpart Application", dated Mar. 12, 2021, p. 1-p. 7.

"International Search Report (Form PCT/ISA/210) of PCT/JP2020/018406," dated Aug. 4, 2020, pp. 1-4.

"Written Opinion of the International Searching Authority (Form PCT/ISA/237) of PCT/JP2020/018406," dated Aug. 4, 2020, with English translation thereof, pp. 1-6.

* cited by examiner

AMMONIA MANUFACTURING
AMMONIA MANUFACTURING APPARATUS AND AMMONIA MANUFACTURING METHOD

CROSS-REFERENCE TO RELATED APPLICATION

This application is a 371 application of the international PCT application serial no. PCT/JP2020/018406, filed on May 1, 2020. The entirety of the above-mentioned patent application is hereby incorporated by reference herein and made a part of this specification.

TECHNICAL FIELD

The present invention relates to an ammonia manufacturing apparatus and an ammonia manufacturing method using renewable energy.

BACKGROUND ART

Conventionally, as a technique for converting renewable energy into an energy carrier, a technique for manufacturing hydrogen ($H_2$) by electrolysis of water using electric power generated by renewable energy has been proposed. For example, Patent Literature 1 describes that when hydrogen is generated by electrolysis using renewable energy, out of electric power generated by a power generation device, electric power consumed when an electrolytic device performs electrolysis is supplied on a priority basis, and surplus electric power is supplied for transportation and storage of hydrogen.

However, hydrogen has a low boiling point, is not easily liquefied, and has problems in transportation, storage, and the like. A compound containing many hydrogen atoms (H) in a molecule thereof, such as ammonia, methane, or an organic hydride has been proposed as an energy carrier. In particular, ammonia ($NH_3$) is attracting attention because ammonia can be burned directly and does not emit carbon dioxide ($CO_2$) even if ammonia is burned.

Electrolysis requires a relatively large amount of electric power. When power is generated in a suitable place where renewable energy is easily available and ammonia is manufactured using hydrogen manufactured by electrolysis, transportation and storage are possible by using ammonia as an energy carrier. However, since renewable energy uses natural energy, the power generation amount thereof is liable to fluctuate. Patent Literature 1 describes that surplus electric power of renewable energy is supplied to an external device such as a hydrogen booster, but neither describes nor suggests that shortage of electric power is supplemented in a case of shortage of the power generation amount of renewable energy.

CITATION LIST

Patent Literature

Patent Literature 1: JP 2019-26858 A

SUMMARY OF INVENTION

Technical Problem

The present invention provides an ammonia manufacturing apparatus and an ammonia manufacturing method capable of effectively dealing with surplus and shortage of electric power due to renewable energy in a case where ammonia is manufactured using renewable energy.

Solution to Problem

A first aspect of the present invention is an ammonia manufacturing apparatus including: a hydrogen generation unit that generates hydrogen by electrolysis of water; an ammonia synthesis unit that synthesizes ammonia by a reaction between hydrogen and nitrogen using hydrogen generated in the hydrogen generation unit; and a nitrogen supply unit that supplies nitrogen to the ammonia synthesis unit, and further including: for at least one raw material component selected from hydrogen generated in the hydrogen generation unit and nitrogen supplied from the nitrogen supply unit, a raw material component storage unit that stores the raw material component supplied to the ammonia synthesis unit; a high-pressure raw material component storage unit that stores the raw material component at a pressure higher than a pressure at which the raw material component is stored in the raw material component storage unit; and a surplus electric power processing unit including a high-pressure raw material component transfer unit that boosts and transfers the raw material component from the raw material component storage unit to the high-pressure raw material component storage unit, and an expander that converts pressure energy of the raw material component supplied from the high-pressure raw material component storage unit into motive power to generate power, in which a first power source using renewable energy is used as a power source for the electrolysis in the hydrogen generation unit, and at least one selected from the group consisting of surplus electric power of the first power source and surplus electric power of a second power source different from the first power source is used as a motive power source for the high-pressure raw material component transfer unit.

A second aspect of the present invention is the ammonia manufacturing apparatus according to the first aspect, in which the motive power source for the high-pressure raw material component transfer unit is surplus electric power of the first power source.

A third aspect of the present invention is the ammonia manufacturing apparatus according to the first or second aspect, in which the nitrogen supply unit includes a liquid nitrogen manufacturing unit that manufactures liquid nitrogen from air, and the surplus electric power processing unit stores liquid nitrogen supplied from the liquid nitrogen manufacturing unit as the raw material component in the high-pressure raw material component storage unit by the high-pressure raw material component transfer unit, vaporizes liquid nitrogen supplied from the high-pressure raw material component storage unit by a vaporizer, and supplies nitrogen gas to the expander to generate power.

A fourth aspect of the present invention is the ammonia manufacturing apparatus according to any one of the first to third aspects, in which as at least one selected from the group consisting of the first power source and the second power source, variable renewable energy selected from solar power generation, wind power generation, solar thermal power generation, and ocean power generation is used.

A fifth aspect of the present invention is the ammonia manufacturing apparatus according to any one of the first to fourth aspects, further including a power generation facility serving as the first power source.

A sixth aspect of the present invention is the ammonia manufacturing apparatus according to the fifth aspect, in which rated power generation output of the power generation facility is larger than electric power consumption of the electrolysis in the hydrogen generation unit.

A seventh aspect of the present invention is the ammonia manufacturing apparatus according to the fifth aspect, in which first electric power consumption, which is a part of electric power consumption of the electrolysis in the hydrogen generation unit, is derived from a power source other than the first power source, second electric power consumption, which is a balance of the electric power consumption of the electrolysis in the hydrogen generation unit, is derived from the first power source, and rated power generation output of the power generation facility is larger than the second electric power consumption.

An eighth aspect of the present invention is the ammonia manufacturing apparatus according to any one of the first to seventh aspects, in which electric power generated by the expander is supplied to any one of the hydrogen generation unit, the nitrogen supply unit, the ammonia synthesis unit, and the surplus electric power processing unit.

A ninth aspect of the present invention is an ammonia manufacturing method including: a hydrogen generation step of generating hydrogen by electrolysis of water; an ammonia synthesis step of synthesizing ammonia by a reaction between hydrogen and nitrogen using hydrogen generated in the hydrogen generation step; and a nitrogen supply step of supplying nitrogen to the ammonia synthesis step, and further including: for at least one raw material component selected from hydrogen generated in the hydrogen generation step and nitrogen supplied from the nitrogen supply step, using: a raw material component storage unit that stores the raw material component supplied to the ammonia synthesis step; a high-pressure raw material component storage unit that stores the raw material component at a pressure higher than a pressure at which the raw material component is stored in the raw material component storage unit; and a surplus electric power processing unit including a high-pressure raw material component transfer unit that boosts and transfers the raw material component from the raw material component storage unit to the high-pressure raw material component storage unit, and an expander that converts pressure energy of the raw material component supplied from the high-pressure raw material component storage unit into motive power to generate power; and using a first power source using renewable energy as a power source for the electrolysis in the hydrogen generation step and using at least one selected from the group consisting of surplus electric power of the first power source and surplus electric power of a second power source different from the first power source as a motive power source for the high-pressure raw material component transfer unit.

A tenth aspect of the present invention is the ammonia manufacturing method according to the ninth aspect, in which the motive power source for the high-pressure raw material component transfer unit is surplus electric power of the first power source.

An eleventh aspect of the present invention is the ammonia manufacturing method according to the ninth or tenth aspect, in which at least a part of the raw material component after the pressure energy of the raw material component is converted into motive power by the expander is supplied to the ammonia synthesis step.

A twelfth aspect of the present invention is the ammonia manufacturing method according to any one of the ninth to eleventh aspects, in which at least a part of the raw material component after the pressure energy of the raw material component is converted into motive power by the expander is stored in the raw material component storage unit.

A thirteenth aspect of the present invention is the ammonia manufacturing method according to any one of the ninth to twelfth aspects, in which electric power generated by the expander is consumed by any one of the hydrogen generation step, the nitrogen supply step, the ammonia synthesis step, and the surplus electric power processing unit.

Advantageous Effects of Invention

According to the first aspect, a raw material component for ammonia synthesis is used as an energy storage medium, and when surplus electric power is generated from renewable energy, pressure energy can be stored in the raw material component. In a case of shortage of electric power from renewable energy, the stored pressure energy can be converted into motive power to generate power.

As a result, surplus and shortage of electric power due to renewable energy can be effectively dealt with. In addition, renewable energy can be used as a power source for electrolysis that generates hydrogen from water.

According to the second aspect, by storing the surplus electric power of the first power source using renewable energy as the pressure energy of the raw material component, surplus and shortage of electric power due to renewable energy can be more effectively dealt with.

According to the third aspect, by using nitrogen which can be easily stored and boosted by liquefaction as an energy storage medium, surplus and shortage of electric power due to renewable energy can be more effectively dealt with.

According to the fourth aspect, since the surplus electric power of the variable renewable energy can be converted into pressure energy of an energy storage medium and stored, surplus and shortage of electric power due to the variable renewable energy can be more effectively dealt with.

According to the fifth aspect, the first power source using renewable energy can be included as a power generation facility involved in ammonia synthesis.

According to the sixth aspect, when electric power obtained by the power generation facility using renewable energy is consumed for electrolysis of water, shortage of electric power is less likely to occur and the operating ratio of a water electrolytic device can be increased.

According to the seventh aspect, a part of the power source for electrolysis of water depends on a power source other than the first power source, and the first power source using renewable energy can be used as a power source of the balance.

According to the eighth aspect, electric power obtained by the surplus electric power processing unit can be used by any one of the hydrogen generation unit, the nitrogen supply unit, the ammonia synthesis unit, and the surplus electric power processing unit.

According to the ninth aspect, a raw material component for ammonia synthesis is used as an energy storage medium, and when surplus electric power is generated from renewable energy, pressure energy can be stored in the raw material component. In a case of shortage of electric power from renewable energy, the stored pressure energy can be converted into motive power to generate power. As a result, surplus and shortage of electric power due to renewable energy can be effectively dealt with. In addition, renewable energy can be used as a power source for electrolysis that generates hydrogen from water.

According to the tenth aspect, by storing the surplus electric power of the first power source using renewable energy as the pressure energy of the raw material component, surplus and shortage of electric power due to renewable energy can be more effectively dealt with.

According to the eleventh aspect, by using at least a part of the pressure-reduced raw material component after the raw material component is used for power generation in the surplus electric power processing unit for ammonia synthesis, the raw material component can be effectively used.

According to the twelfth aspect, by storing at least a part of the pressure-reduced raw material component after the raw material component is used for power generation in the surplus electric power processing unit, the raw material component can be effectively used. The eleventh and twelfth aspects can be combined with each other such that a part of the pressure-reduced raw material component is used for ammonia synthesis and the other part is stored.

According to the thirteenth aspect, electric power obtained by the surplus electric power processing unit can be used by any one of the hydrogen generation unit, the nitrogen supply unit, the ammonia synthesis unit, and the surplus electric power processing unit.

DESCRIPTION OF EMBODIMENTS

Figure 1:
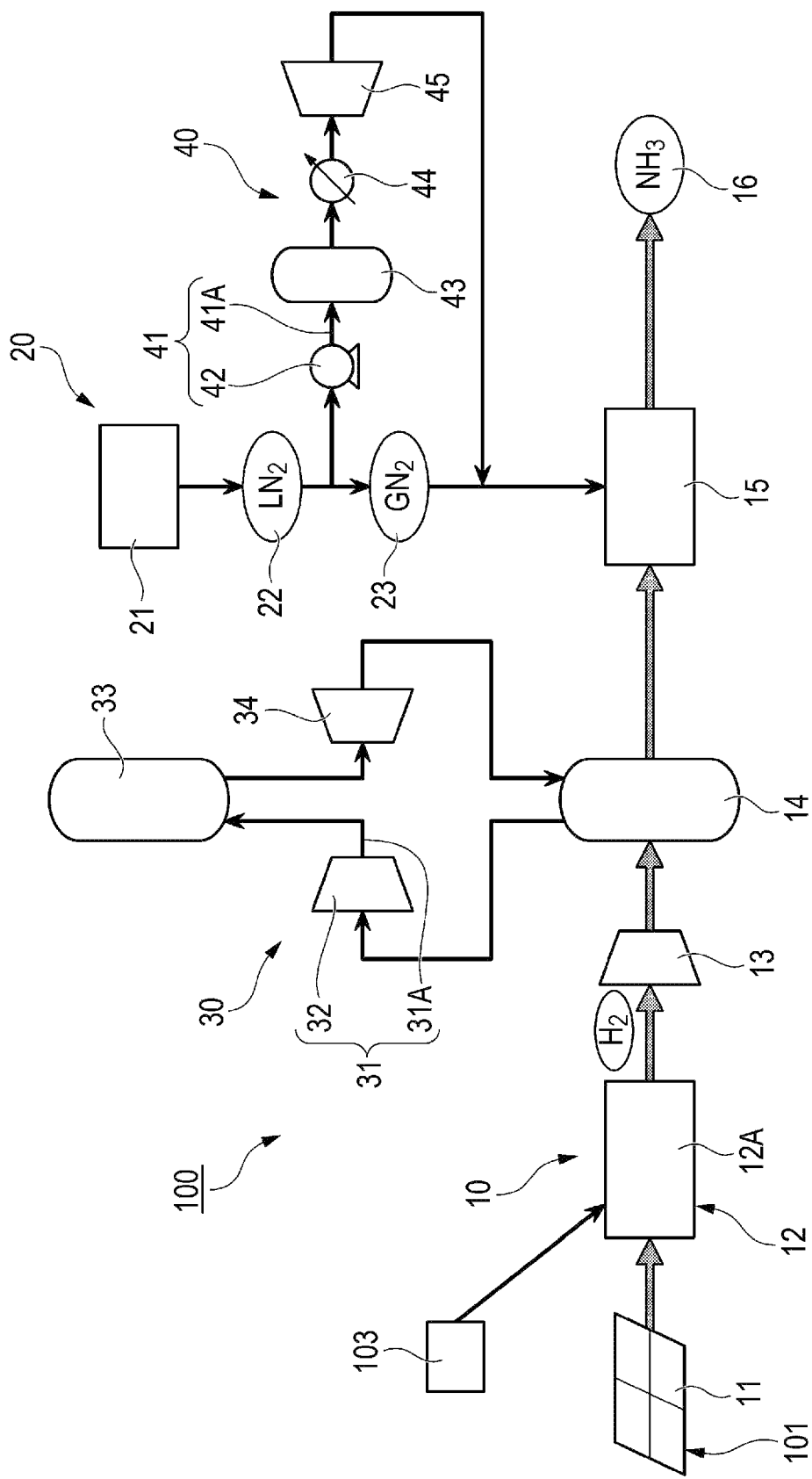
FIG. 1 is a flow chart illustrating an outline of an ammonia manufacturing apparatus and method.

FIG. 1 is a flow chart illustrating an outline of an ammonia manufacturing apparatus and an ammonia manufacturing method of the present embodiment. An ammonia manufacturing apparatus 100 of the present embodiment includes: a hydrogen generation unit 12 that generates hydrogen by electrolysis of water; an ammonia synthesis unit 15 that synthesizes ammonia by a reaction between hydrogen and nitrogen using hydrogen generated in the hydrogen generation unit 12; and a nitrogen supply unit 20 that supplies nitrogen to the ammonia synthesis unit 15. The hydrogen generation unit 12 includes a water electrolytic device 12A that electrolyzes water.

The ammonia manufacturing method of the present embodiment includes: a hydrogen generation step of generating hydrogen by electrolysis of water; an ammonia synthesis step of synthesizing ammonia by a reaction between hydrogen and nitrogen using hydrogen generated in the hydrogen generation step; and a nitrogen supply step of supplying nitrogen to the ammonia synthesis step. The hydrogen generation unit 12, the ammonia synthesis unit 15, and the nitrogen supply unit 20 can be used in the hydrogen generation step, the ammonia synthesis step, and the nitrogen supply step, respectively.

As a power source for the water electrolytic device 12A, a first power source 101 using renewable energy is used. The first power source 101 is derived from electric power generated by a power generation facility 11 using renewable energy. The power generation facility 11 may be installed as a part of the ammonia manufacturing apparatus 100. The power generation facility 11 may be installed by an electric power company different from an installer of the ammonia manufacturing apparatus 100.

The power generation facility 11 may be installed exclusively for the ammonia manufacturing apparatus 100, or may be used for a joint purpose of a demand of the ammonia manufacturing apparatus 100 and other demands. The installation location of the power generation facility 11 may be on the same site as the ammonia manufacturing apparatus 100, may be a location adjacent to the ammonia manufacturing apparatus 100, or may be a location away from the ammonia manufacturing apparatus 100.

As the first power source 101, variable renewable energy selected from solar power generation, wind power generation, solar thermal power generation, and ocean power generation may be used. As the first power source 101, non-variable renewable energy such as biomass power generation, geothermal power generation, or hydropower generation may be used. In either case, renewable energy can be used as the power source for the water electrolytic device 12A.

Note that the ocean power generation is not particularly limited, but examples thereof include wave power generation using wave energy, tidal flow power generation using a horizontal flow due to tide, tidal force power generation using a tide level difference due to tide, ocean flow power generation due to horizontal circulation of seawater, and ocean temperature difference power generation due to a temperature difference between a surface layer of the ocean and the deep sea. The hydropower generation may be a canal type or a dam type, or a dam canal type in which both are used in combination.

Electric power consumption of the electrolysis of water in the hydrogen generation unit 12 corresponds to electric power consumption of the water electrolytic device 12A. Rated power generation output of the power generation facility 11 is preferably larger than the electric power consumption of the water electrolytic device 12A. As a result, when electric power obtained by the power generation facility 11 is supplied to the water electrolytic device 12A, shortage of electric power is less likely to occur and the operating ratio of the water electrolytic device can be increased. As the power source for the water electrolytic device 12A, it is also possible to use only the first power source 101 without using a third power source 103 described later.

First electric power consumption, which is a part of the electric power consumption of the water electrolytic device 12A, may be derived from the third power source 103, which is a power source other than the first power source 101. As the third power source 103, a power source due to power generation other than renewable energy can be used. Examples of the power generation other than renewable energy include thermal power generation and nuclear power generation.

The third power source 103 may be used in a case of shortage of electric power supplied from the first power source 101 with respect to the electric power consumption of the water electrolytic device 12A. In addition, the first electric power consumption may be set to a certain ratio in advance, and the third power source 103 may be used constantly. When the electric power consumption of the water electrolytic device 12A is 100% is, the ratio of the first electric power consumption is, for example, 10 to 90%, but may be less than 10%, and may be larger than 90%.

Second electric power consumption, which is the balance of the electric power consumption of the water electrolytic device 12A with respect to the first electric power consumption described above, is preferably derived from the first power source 101. In this case, the rated power generation output of the power generation facility 11 is preferably larger than the second electric power consumption. As a result, when electric power obtained by the power generation facility 11 is supplied to the water electrolytic device 12A, shortage of electric power is less likely to occur. When the electric power consumption of the water electrolytic device 12A is 100% is, the ratio of the second electric power consumption is, for example, 10 to 90%, but may be less than 10%, and may be larger than 90%.

When the electric power consumption of the water electrolytic device 12A is compared with the rated power generation output of the power generation facility 11, rated electric power consumption of the water electrolytic device 12A may be compared with the rated power generation output of the power generation facility 11. During operation of the ammonia manufacturing apparatus 100, the electric power consumption of the water electrolytic device 12A may be different from the rated electric power consumption.

The ammonia manufacturing apparatus 100 of the present embodiment includes an energy carrier manufacturing unit 10 for converting renewable energy into ammonia, which is an energy carrier. The energy carrier manufacturing unit 10 may include a combination of the power generation facility 11, the hydrogen generation unit 12, a low-pressure hydrogen transfer unit 13, a low-pressure hydrogen storage unit 14, the ammonia synthesis unit 15, and an ammonia storage unit 16, or a part thereof.

Hydrogen ($H_2$) generated in the hydrogen generation unit 12 is set so as to have a pressure suitable for storage in the low-pressure hydrogen transfer unit 13, and can be stored in the low-pressure hydrogen storage unit 14. The low-pressure hydrogen transfer unit 13 may include a hydrogen booster. The hydrogen storage pressure in the low-pressure hydrogen storage unit 14 is, for example, 80 bar (8 MPa).

The ammonia synthesis unit 15 receives hydrogen and nitrogen and synthesizes ammonia ($NH_3$) by a catalytic reaction. Hydrogen as an ammonia synthesis raw material may be directly supplied from the hydrogen generation unit 12, but is preferably supplied from the low-pressure hydrogen storage unit 14 to the ammonia synthesis unit 15. Nitrogen as an ammonia synthesis raw material is supplied from the nitrogen supply unit 20 to the ammonia synthesis unit 15. Ammonia synthesized in the ammonia synthesis unit 15 may be stored in the ammonia storage unit 16.

The nitrogen supply unit 20 may include a liquid nitrogen manufacturing unit 21 that manufactures liquid nitrogen from air. Examples of the liquid nitrogen manufacturing unit 21 include a device that liquefies air by compression and separates liquid nitrogen by fractional distillation of the liquefied air. Liquid nitrogen manufactured in the liquid nitrogen manufacturing unit 21 is stored in the liquid nitrogen storage unit 22. When the nitrogen supply unit 20 includes the liquid nitrogen manufacturing unit 21, desired nitrogen gas can be obtained from the atmosphere. When the nitrogen supply unit 20 includes the liquid nitrogen storage unit 22, nitrogen can be stored in a liquefied state in a saving space.

The nitrogen supply unit 20 may include a nitrogen gas generation unit 23 that vaporizes liquid nitrogen ($LN_2$) stored in the liquid nitrogen storage unit 22 into nitrogen gas ($GN_2$). The nitrogen gas generation unit 23 may generate nitrogen gas according to the amount supplied to the ammonia synthesis unit 15. The nitrogen gas generation unit 23 is not limited to a device that receives liquid nitrogen and generates nitrogen gas by vaporization thereof, but may be a device that separates nitrogen from air in the gas phase by adsorption of oxygen molecules or the like and supplies high-purity nitrogen gas. The nitrogen gas generation unit 23 may be a device that supplies nitrogen gas from a facility that stores required nitrogen gas.

The ammonia manufacturing apparatus 100 of the present embodiment includes a surplus electric power processing unit 30, 40 using hydrogen or nitrogen, which is a raw material component of ammonia, as an energy storage medium. The first surplus electric power processing unit 30 uses hydrogen generated in the hydrogen generation unit 12 as an energy storage medium. The second surplus electric power processing unit 40 uses nitrogen supplied from the nitrogen supply unit 20 as an energy storage medium. The ammonia manufacturing apparatus 100 may include both the first surplus electric power processing unit 30 and the second surplus electric power processing unit 40, or may include only one of the first surplus electric power processing unit 30 and the second surplus electric power processing unit 40.

By storing a raw material component (hydrogen, nitrogen) supplied to the ammonia synthesis unit 15 at a higher pressure in the surplus electric power processing unit 30, 40 using surplus electric power of renewable energy power generation, the surplus electric power can be converted into pressure energy of the raw material component and stored. Furthermore, by converting the pressure energy of the raw material component stored at a higher pressure into motive power, power can be generated. As a result, energy derived from the surplus electric power can be used as electric energy in a case of shortage of electric power from renewable energy. An expander 34, 45 can generate power by driving a turbine or the like when high-pressure gas is expanded.

The first surplus electric power processing unit 30 includes: a high-pressure hydrogen transfer unit 31 that includes a hydrogen booster 32, boosts hydrogen from the low-pressure hydrogen storage unit 14, and transfers the hydrogen to the high-pressure hydrogen storage unit 33; and the first expander 34 that converts pressure energy of hydrogen supplied from the high-pressure hydrogen storage unit 33 into motive power to generate power. The high-pressure hydrogen transfer unit 31 in the illustrated example includes the hydrogen booster 32 and a pipe 31A that transfers hydrogen boosted by the hydrogen booster 32 to the high-pressure hydrogen storage unit 33. When the hydrogen booster 32 boosts hydrogen gas, the hydrogen gas is compressed and the volume of the high-pressure hydrogen gas is reduced. The hydrogen booster 32 in this case is, for example, a hydrogen gas compressor.

The second surplus electric power processing unit 40 includes: a liquid nitrogen transfer unit 41 that includes a liquid nitrogen pump 42, boosts nitrogen from the liquid nitrogen storage unit 22, and transfers the nitrogen to a high-pressure liquid nitrogen storage unit 43; a vaporizer 44 that vaporizes liquid nitrogen supplied from the high-pressure liquid nitrogen storage unit 43; and the second expander 45 that converts pressure energy of the nitrogen gas vaporized by the vaporizer 44 into motive power to generate power. The liquid nitrogen transfer unit 41 in the illustrated example includes the liquid nitrogen pump 42 and a pipe 41A that transfers nitrogen boosted by the liquid nitrogen pump 42 to the high-pressure liquid nitrogen storage unit 43.

The low-pressure hydrogen storage unit 14 and the liquid nitrogen storage unit 22 are raw material component storage units for storing a raw material component (hydrogen, nitrogen) supplied to the ammonia synthesis unit 15. Meanwhile, the high-pressure hydrogen storage unit 33 and the high-pressure liquid nitrogen storage unit 43 are high-pressure raw material component storage units that store a raw material component (hydrogen, nitrogen) as an energy storage medium at a higher pressure than the raw material component storage unit.

The second surplus electric power processing unit 40 in the illustrated example stores liquid nitrogen at a pressure higher than that of liquid nitrogen stored in the liquid nitrogen storage unit 22 in the high-pressure liquid nitrogen storage unit 43. Therefore, when high-pressure liquid nitrogen stored in the high-pressure liquid nitrogen storage unit 43 is supplied to the second expander 45, the high-pressure liquid nitrogen needs to pass through the vaporizer 44.

When a raw material component supplied to the ammonia synthesis unit 15 is stored as nitrogen gas, nitrogen gas at a higher pressure may be stored as an energy storage medium. In this case, although not particularly illustrated, the second surplus electric power processing unit 40 includes a high-pressure nitrogen gas transfer unit that includes a nitrogen gas booster, boosts nitrogen gas from a low-pressure nitrogen gas storage unit, and transfers the nitrogen gas to a high-pressure nitrogen gas storage unit. As a result, high-pressure nitrogen gas supplied from the high-pressure nitrogen gas storage unit can be directly supplied to the second expander 45 to generate power. That is, when high-pressure nitrogen gas is used as an energy storage medium, the vaporizer 44 can be omitted, and the second expander 45 can convert pressure energy of nitrogen gas supplied from the high-pressure nitrogen gas storage unit into motive power to generate power. When the nitrogen gas booster boosts nitrogen gas, the nitrogen gas is compressed and the volume of the high-pressure nitrogen gas is reduced. The nitrogen gas booster in this case is, for example, a nitrogen gas compressor.

Figure 2:
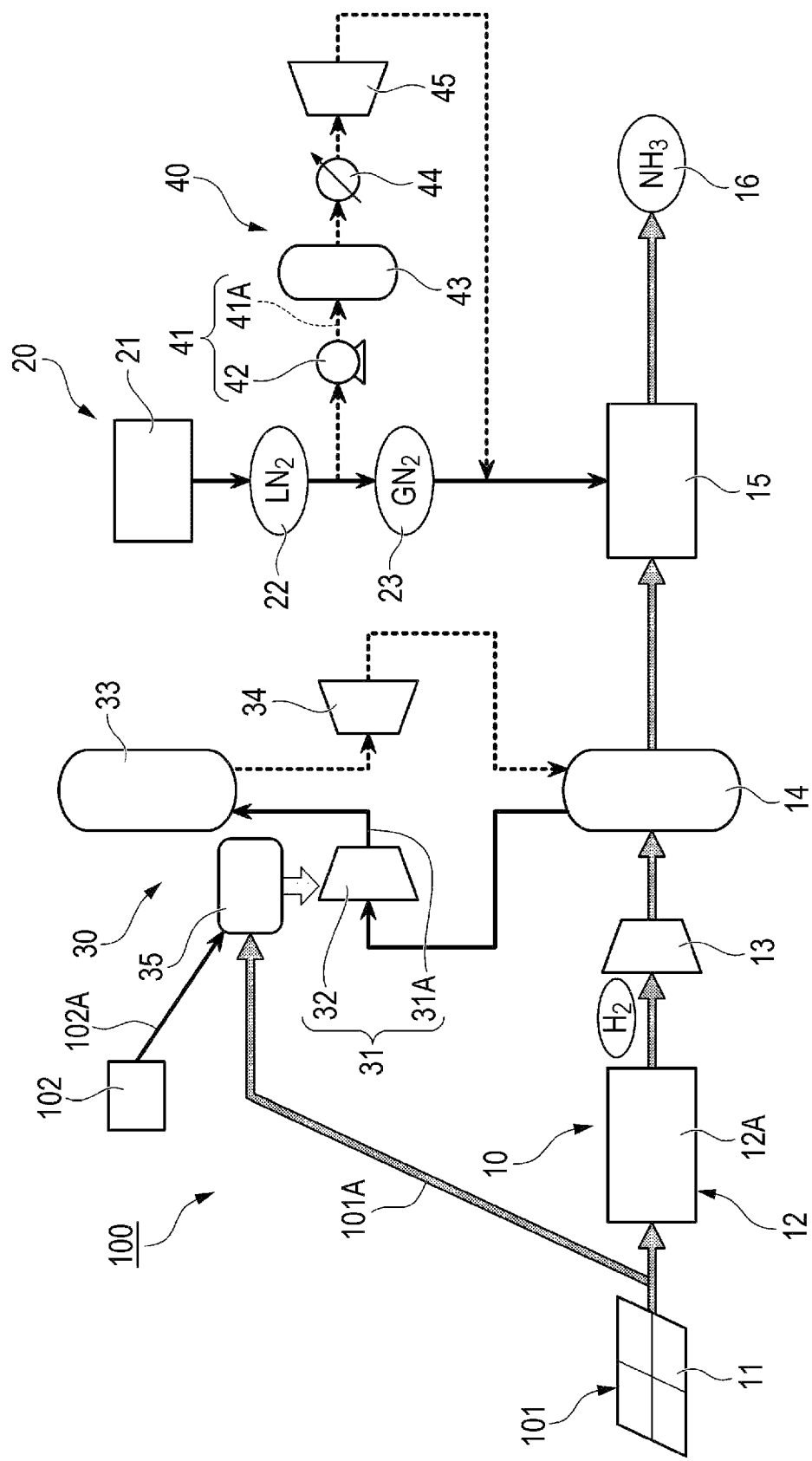
FIG. 2 is a flow chart illustrating a step of storing high-pressure hydrogen using surplus electric power.
Figure 3:
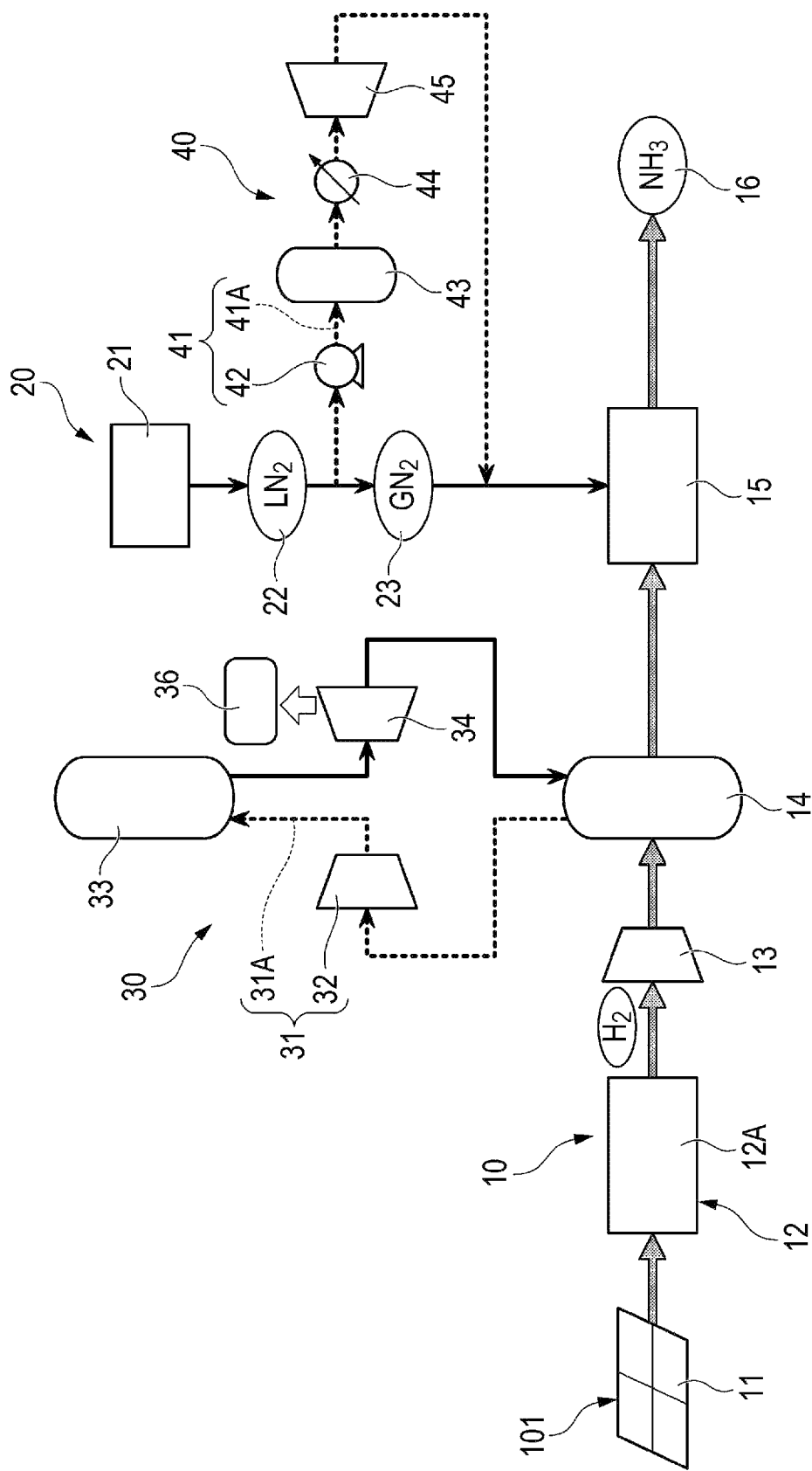
FIG. 3 is a flow chart illustrating a step of generating power using high-pressure hydrogen.
Figure 4:
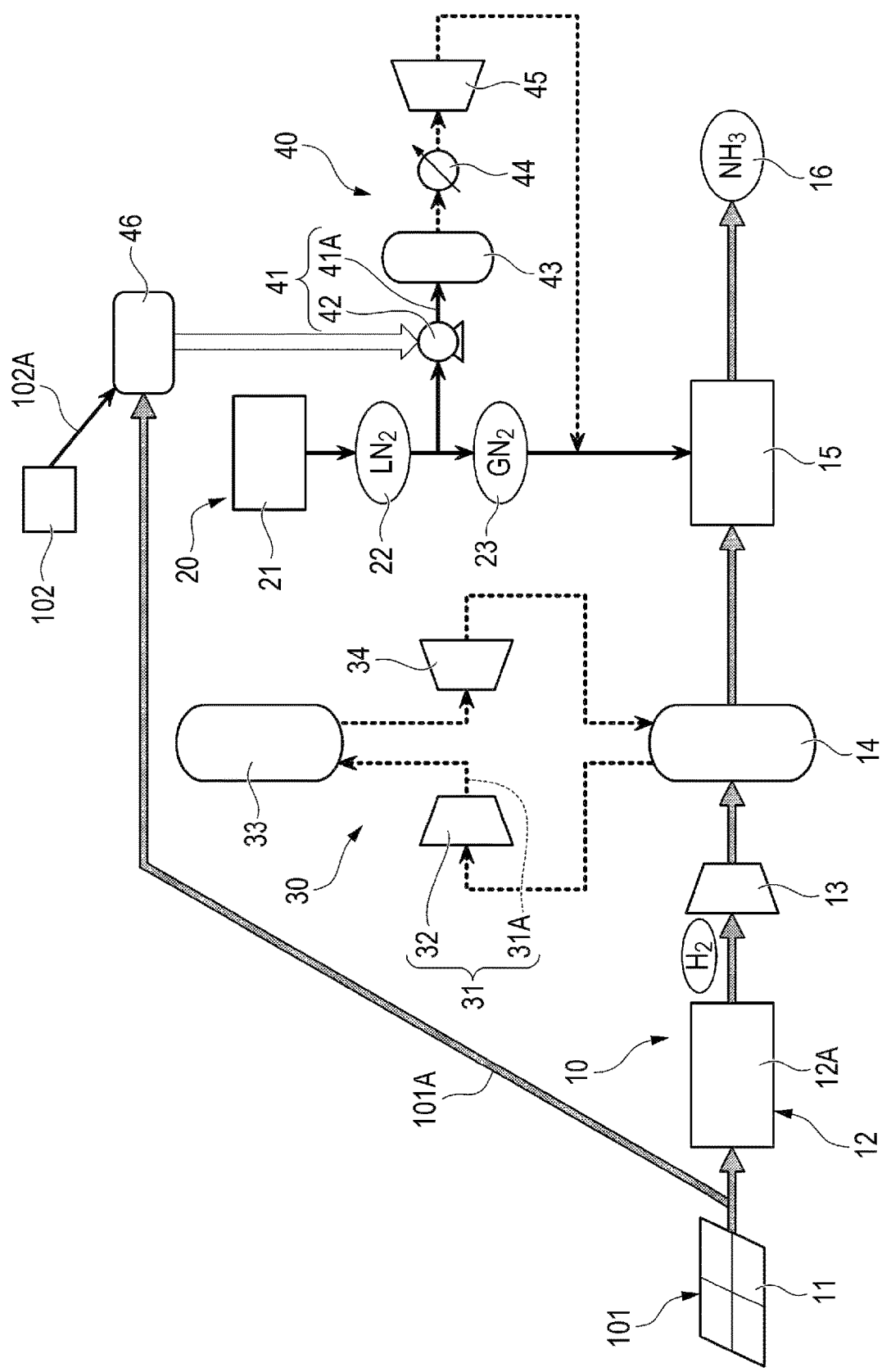
FIG. 4 is a flow chart illustrating a step of storing high-pressure nitrogen using surplus electric power.
Figure 5:
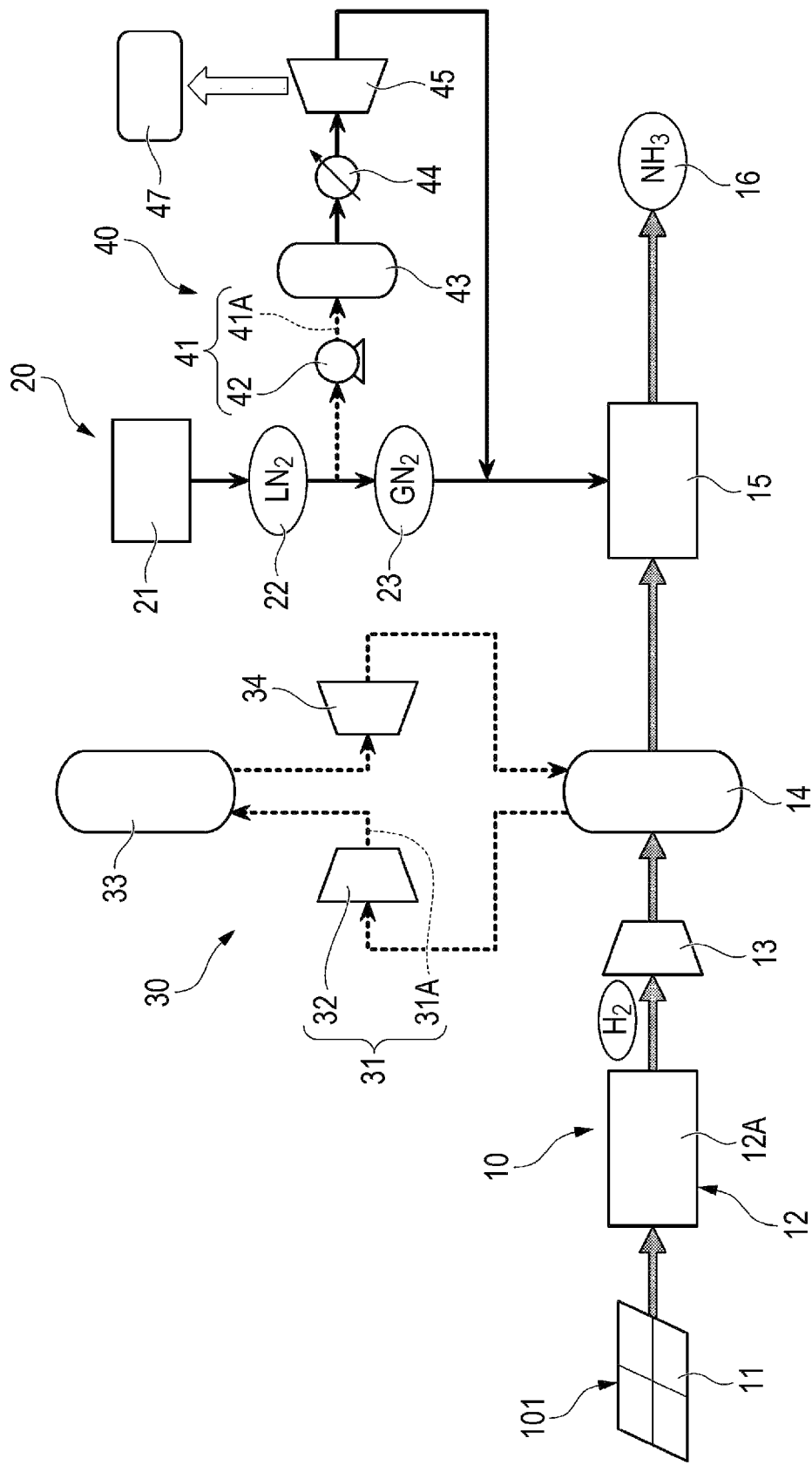
FIG. 5 is a flow chart illustrating a step of generating power using high-pressure nitrogen.

FIG. 2 illustrates a step of storing high-pressure hydrogen using surplus electric power 35. FIG. 3 illustrates a step of obtaining electric power 36 by power generation using high-pressure hydrogen. FIG. 4 illustrates a step of storing high-pressure nitrogen using surplus electric power 46. FIG. 5 illustrates a step of obtaining electric power 47 by power generation using high-pressure nitrogen.

In order to store an energy storage medium in the high-pressure hydrogen storage unit 33 or the high-pressure liquid nitrogen storage unit 43, it is necessary to convert a raw material component into a high-pressure energy storage medium. The high-pressure hydrogen transfer unit 31 and the liquid nitrogen transfer unit 41 are high-pressure raw material component transfer units for transferring a high-pressure raw material component. The surplus electric power 35, 46 is used as a motive power source for the high-pressure raw material component transfer unit. Specifically, the surplus electric power 35 is used as a motive power source for the hydrogen booster 32, and the surplus electric power 46 is used as a motive power source for the liquid nitrogen pump 42. As a result, the surplus electric power can be effectively utilized.

The surplus electric power 35, 46, which is a motive power source for the high-pressure raw material component transfer unit, is at least one selected from the group consisting of surplus electric power 101A of the first power source 101 and surplus electric power 102A of the second power source 102. The surplus electric power 101A of the first power source 101 corresponds to electric power obtained by subtracting rated electric power consumption of the water electrolytic device 12A from electric power supplied by the first power source 101. The surplus electric power 102A of the second power source 102 may be surplus electric power generated by any power source different from the first power source 101.

The surplus electric power 101A of the first power source 101 is generated when electric power supplied by the first power source 101 exceeds rated electric power consumption of the water electrolytic device 12A. Therefore, when the power generation amount by the power generation facility 11 increases, the surplus electric power 101A may be generated. Furthermore, when the first power source 101 is a common power source for supplying electric power to a plurality of consumers, the surplus electric power 101A may also be generated, for example, when electric power consumption of other consumers is low. In either case, it is not appropriate to supply electric power exceeding rated electric power consumption to the water electrolytic device 12A. Therefore, the surplus electric power 101A is used as a motive power source for the high-pressure raw material component transfer unit.

The second power source 102 may be a power source using renewable energy or a power source using power generation other than renewable energy, and a power source using renewable energy and a power source using power generation other than renewable energy may be used in combination. Renewable energy used for the second power source 102 may be variable renewable energy selected from solar power generation, wind power generation, solar thermal power generation, and ocean power generation, and may be non-variable renewable energy such as biomass power generation, geothermal power generation, or hydropower generation. Examples of power generation other than renewable energy used in the second power source 102 include thermal power generation and nuclear power generation. The second power source 102 may be any power source other than the first power source 101, and two or more types of power sources other than the first power source 101 may be arbitrarily combined with each other.

The surplus electric power 102A of the second power source 102 may be surplus electric power derived from a power source not serving as a power source for the water electrolytic device 12A. The second power source 102 may be system electric power supplied from another power generation company through an electric power system. The surplus electric power 102A of the second power source 102 in this case corresponds to system electric power when a "raised demand response" for increasing electric power consumption is demanded in response to a request of a power generation company. This case contributes to stabilization of electric power supply of the power generation company, and therefore it is possible to further reduce electric power supply cost.

When the surplus electric power 101A, 102A can be used from the first power source 101 or the second power source 102, at least a part of the surplus electric power 101A, 102A can be used as the surplus electric power 35, 46 serving as a motive power source for the high-pressure raw material component transfer unit, and a high-pressure raw material component can be stored. As illustrated in FIG. 2, high-pressure hydrogen may be stored in the high-pressure hydrogen storage unit 33. As illustrated in FIG. 4, high-pressure liquid nitrogen may be stored in the high-pressure liquid nitrogen storage unit 43. Storage of high-pressure hydrogen and storage of high-pressure liquid nitrogen may be performed at the same time.

In a case of shortage of electric power from renewable energy, as illustrated in FIG. 3, the electric power 36 may be generated by the first expander 34 using high-pressure hydrogen in the high-pressure hydrogen storage unit 33 for use. As illustrated in FIG. 5, the electric power 47 may be generated by the second expander 45 using high-pressure liquid nitrogen in the high-pressure liquid nitrogen storage unit 43 for use. Power generation of the first expander 34 and power generation of the second expander 45 may be performed at the same time.

The electric power 36, 47 generated by the expanders 34, 45 can be supplied to any one or more of the hydrogen generation unit 12, the nitrogen supply unit 20, the ammonia synthesis unit 15, and the surplus electric power processing unit 30, 40. In addition, the electric power 36, 47 may be used for any electric power demand of the ammonia manufacturing apparatus 100 or facilities related thereto. Use of the electric power 36, 47 is not particularly limited, but examples thereof include electrolysis, motive power, control, communication, lighting, display, heating, cooling, pressurization, decompression, and air conditioning.

At least a part of a raw material component (hydrogen, nitrogen) after being used for power generation by the expander 34, 45 may be supplied to the ammonia synthesis unit 15 and directly used for ammonia synthesis. At least a part of the raw material component (hydrogen, nitrogen) after being used for power generation by the expander 34, 45 may be stored in the raw material component storage unit. As a result, the raw material component can be effectively used. At least a part of the raw material component (particularly nitrogen gas) after being used for power generation by the expander 34, 45 can be released into the atmosphere and discarded.

According to the above-described ammonia manufacturing apparatus 100, a raw material component for ammonia synthesis is used as an energy storage medium in the surplus electric power processing unit 30, 40, and when the surplus electric power 35, 46 is generated from renewable energy, pressure energy can be stored in the raw material component. In a case of shortage of electric power from renewable energy, the pressure energy of the raw material component stored at a high pressure can be converted into motive power to generate power. By using these together, it is possible to effectively deal with surplus and shortage of electric power due to renewable energy.

At least a part of the surplus electric power 35, 46 serving as a motive power source for the high-pressure raw material component transfer unit is preferably the surplus electric power 101A of the first power source 101, and more preferably the surplus electric power 101A of the first power source 101 using variable renewable energy. As a result, there is little influence by output fluctuation of renewable energy used as a power source of the water electrolytic device 12A, and effective use is possible.

At least a part of the surplus electric power 35, 46 serving as a motive power source for the high-pressure raw material component transfer unit is preferably the surplus electric power 102A of the second power source 102 using renewable energy, and more preferably the surplus electric power 102A of the second power source 102 using variable renewable energy. As a result, surplus electric power generated in power generation of renewable energy can be effectively used. Note that as at least a part of a motive power source for the high-pressure raw material component transfer unit, electric power other than surplus electric power may be used in addition to the surplus electric power 35, 46.

The present invention is described above on the basis of preferred embodiments, but the present invention is not limited to the above embodiments. Various modifications are possible without departing from the spirit of the present invention. Examples of the modifications include addition, replacement, omission, and other changes of the constituent elements in each embodiment.

INDUSTRIAL APPLICABILITY

The present invention can be used for manufacturing ammonia using renewable energy. Ammonia can be used as an energy carrier or fuel. Ammonia can be used in manufacturing an organic nitrogen compound, an inorganic nitrogen compound, a chemical fertilizer, a chemical, and the like.

The invention claimed is:

1. An ammonia manufacturing apparatus comprising:
   a hydrogen generation unit that generates hydrogen by electrolysis of water;
   an ammonia synthesis unit that synthesizes ammonia by a reaction between hydrogen and nitrogen using hydrogen generated in the hydrogen generation unit; and
   a nitrogen supply unit that supplies nitrogen to the ammonia synthesis unit, and
   further comprising:
   a first surplus electric power processing unit,
   the first surplus electric power processing unit including:
   a first raw material component storage unit that stores hydrogen generated in the hydrogen generation unit supplied to the ammonia synthesis unit;
   a first high-pressure raw material component storage unit that stores the hydrogen at a pressure higher than a pressure at which the hydrogen is stored in the first raw material component storage unit;
   a first high-pressure raw material component transfer unit that increases the pressure of the hydrogen from the first raw material component storage unit and transfers the hydrogen from the first raw material component storage unit to the first high-pressure raw material component storage unit; and
   a first expander that converts pressure energy of the hydrogen supplied from the first high-pressure raw material component storage unit into motive power to generate power,
   wherein
   a first power source using renewable energy is used as a power source for the electrolysis in the hydrogen generation unit, and at least one selected from the group consisting of surplus electric power of the first power source and surplus electric power of a second power source different from the first power source is used as a motive power source for the first high-pressure raw material component transfer unit.

2. The ammonia manufacturing apparatus according to claim 1, wherein the motive power source for the first high-pressure raw material component transfer unit is surplus electric power of the first power source.

3. The ammonia manufacturing apparatus according to claim 1, wherein
   the nitrogen supply unit includes a liquid nitrogen manufacturing unit that manufactures liquid nitrogen from air.

4. The ammonia manufacturing apparatus according to claim 1, wherein variable renewable energy selected from solar power generation, wind power generation, solar thermal power generation, and ocean power generation is used as at least one of the first power source and the second power source.

5. The ammonia manufacturing apparatus according to claim 1, further comprising a power generation facility serving as the first power source.

6. The ammonia manufacturing apparatus according to claim 5, wherein rated power generation output of the power generation facility is larger than electric power consumption of the electrolysis in the hydrogen generation unit.

7. The ammonia manufacturing apparatus according to claim 5, wherein first electric power consumption, which is a part of electric power consumption of the electrolysis in the hydrogen generation unit, is derived from a power source other than the first power source, second electric power consumption, which is a balance of the electric power consumption of the electrolysis in the hydrogen generation unit, is derived from the first power source, and rated power generation output of the power generation facility is larger than the second electric power consumption.

8. The ammonia manufacturing apparatus according to claim 1, wherein electric power generated by the first expander is supplied to any one of the hydrogen generation unit, the nitrogen supply unit, the ammonia synthesis unit and the first surplus electric power processing unit.

9. An ammonia manufacturing method comprising:
a hydrogen generation step of generating hydrogen by electrolysis of water;
an ammonia synthesis step of synthesizing ammonia by a reaction between hydrogen and nitrogen using hydrogen generated in the hydrogen generation step; and
a nitrogen supply step of supplying nitrogen to the ammonia synthesis step, and
further comprising:
a first surplus electric power processing unit for the hydrogen generated in the hydrogen generation step,
the first surplus electric power processing unit including:
a first raw material component storage unit that stores hydrogen generated in the hydrogen generation step supplied to the ammonia synthesis step;
a first high-pressure raw material component storage unit that stores the hydrogen at a pressure higher than a pressure at which the hydrogen is stored in the first raw material component storage unit;
a first high-pressure raw material component transfer unit that increases the pressure of the hydrogen from the first raw material component storage unit and transfers the hydrogen from the first raw material component storage unit to the first high-pressure raw material component storage unit; and
a first expander that converts pressure energy of the hydrogen supplied from the first high-pressure raw material component storage unit into motive power to generate power;
and
using a first power source using renewable energy as a power source for the electrolysis in the hydrogen generation step and using at least one selected from the group consisting of surplus electric power of the first power source and surplus electric power of a second power source different from the first power source as a motive power source for the first high-pressure raw material component transfer unit.

10. The ammonia manufacturing method according to claim 9, wherein the motive power source for the first high-pressure raw material component transfer unit is the surplus electric power of the first power source.

11. The ammonia manufacturing method according to claim 9, wherein at least a part of the hydrogen after the pressure energy of the hydrogen is converted into motive power by the first expander is supplied to the ammonia synthesis step.

12. The ammonia manufacturing method according to claim 9, wherein at least a part of the hydrogen after the pressure energy of the hydrogen is converted into motive power by the first expander is stored in the first raw material component storage unit.

13. The ammonia manufacturing method according to claim 9, wherein electric power generated by the first expander is consumed by any one of the hydrogen generation step, the nitrogen supply step, the ammonia synthesis step and the first surplus electric power processing unit.

* * * * *